(12) United States Patent
Law et al.

(10) Patent No.: US 9,058,519 B2
(45) Date of Patent: Jun. 16, 2015

(54) SYSTEM AND METHOD FOR PASSIVE LIVE PERSON VERIFICATION USING REAL-TIME EYE REFLECTION

(71) Applicant: QUALCOMM Incorporated, San Diego, CA (US)

(72) Inventors: Henry Hing Law, Scarborough (CA); Tung Chuen Kwong, Markham (CA); Benjamin Koon Pan Chan, Markham (CA); Wilson Hung Yu, Markham (CA); Yugang Zhou, Markham (CA)

(73) Assignee: QUALCOMM INCORPORATED, San Diego, CA (US)

( * ) Notice: Subject to any disclaimer, the term of this patent is extended or adjusted under 35 U.S.C. 154(b) by 149 days.

(21) Appl. No.: 13/717,513

(22) Filed: Dec. 17, 2012

(65) Prior Publication Data
US 2014/0169642 A1    Jun. 19, 2014

(51) Int. Cl.
G06K 9/00    (2006.01)
G06F 21/00    (2013.01)

(52) U.S. Cl.
CPC ........ G06K 9/00597 (2013.01); G06K 9/00899 (2013.01)

(58) Field of Classification Search
USPC ......... 382/104, 100, 115, 118, 117, 181, 190, 382/155, 156, 276, 293, 173, 195, 217, 218, 382/224, 274; 348/61, 36, 143, E5.001, 348/E5.085, E5.091, E7.087, E7.001; 375/E7.026, E7.126, E7.175, E7.182; 713/186, 182, 185; 235/435, 437
See application file for complete search history.

(56) References Cited

U.S. PATENT DOCUMENTS 5,016,282 A    5/1991   Tomono et al.
6,309,069 B1   10/2001  Seal et al.
(Continued)

FOREIGN PATENT DOCUMENTS

WO    WO-2010003410 A1    1/2010

OTHER PUBLICATIONS

International Search Report and Written Opinion—PCT/US2013/071482—ISA/EPO—Feb. 18, 2014.
Iqbal N., et al., "A Study on Human Gaze Estimation Using Screen Reflection", Nov. 2, 2008, Intelligent Data Engineering and Automated Learning A IDEAL 2008; [Lecture Notes in Computer Science], Springer Berlin Heidelberg, pp. 104-111, XP019109607, ISBN: 978-3-540-88905-2.

(Continued)

*Primary Examiner* — Sheela Chawan
(74) *Attorney, Agent, or Firm* — Knobbe Martens Olson & Bear LLP

(57) ABSTRACT

Systems, methods, and apparatus for detecting a live human face in an image are disclosed. The methods, systems, and apparatus are capable of capturing an image of a verification pattern that has been reflected from a defined region of interest of a user's eye. The captured image can be compared to the emitted verification pattern to determine whether the captured reflection matches the emitted pattern and is within the region of interest to verify a live user of an electronic device.

34 Claims, 7 Drawing Sheets

LIVE PERSON VALIDATION PROCESS

(56) References Cited

U.S. PATENT DOCUMENTS

| | | | |
|---|---|---|---|
| 6,393,136 B1 | 5/2002 | Amir et al. | |
| 6,542,624 B1 * | 4/2003 | Oda | 382/117 |
| 7,118,217 B2 | 10/2006 | Kardon et al. | |
| 7,492,926 B2 | 2/2009 | Kang | |
| 7,508,960 B1 | 3/2009 | Bolle et al. | |
| 7,801,335 B2 * | 9/2010 | Hanna et al. | 382/117 |
| 8,092,021 B1 | 1/2012 | Northcott et al. | |
| 2011/0007949 A1 * | 1/2011 | Hanna et al. | 382/107 |

OTHER PUBLICATIONS

Nitschke C., et al., "Display-camera calibration using eye reflections and geometry constraints", Computer Vision and Image Understanding, Academic Press, US, vol. 115, No. 6, Feb. 25, 2011, pp. 835-853, XP028191011, ISSN: 1077-3142, DOI: 10.1016/J.CVIU.2011.02.008.

* cited by examiner

LIVE PERSON VALIDATION PROCESS

ON AND OFF REFLECTION

IMAGE MOVEMENT REFLECTION

EYE SHOWING THE REFLECTION IN THE CORNEA

SHAPE OR PATTERN REFLECTION

EYE SHOWING THE REFLECTION IN THE CORNEA

SYSTEM AND METHOD FOR PASSIVE LIVE PERSON VERIFICATION USING REAL-TIME EYE REFLECTION

TECHNICAL FIELD

The present disclosure relates to systems and methods for passive facial verification. In particular, the disclosure relates to systems and methods for validating that a detected human face is a live human face through real-time eye reflection.

BACKGROUND

Facial detection and/or verification systems can be useful in a variety of contexts, including, e.g., parental control applications, law enforcement, mobile banking, and security applications. Conventional automated facial detection systems can detect a human face in an image. However, these systems generally cannot determine whether the face detected in the image was captured from a live human face, or merely captured from a photograph or other reproduction of a human face.

For example, in some cases, the detected face can come from an artificial source, such as a face in a photograph, an image of a face on a display screen, a facial mask, a model reproduction of a face, a mannequin, or any other non-living face. A subject who wants to create fake identification documents, for example, can use a photograph of someone else's face, or a mask, to try to trick the facial detection system. Moreover, even for sophisticated systems that account for blinking and other types of facial motion, detecting a live face maybe thwarted by using a video stream of someone else's face instead of a live face.

SUMMARY OF THE INVENTION

Some of the embodiments may comprise a method for authenticating a user of a device, comprising the steps of defining a region of interest corresponding to a user's eye; calibrating a background pixel range of the region of interest of the user's eye; emitting a verification pattern from a display of the device; capturing a reflected image of the verification pattern from the region of interest of the user's eye; and verifying a live user by comparing the captured reflected image to an expected pixel pattern.

Other embodiments may comprise a system for improving verification of passive recognition of a user's face by a device. The system may comprise an image sensor connected to a display device and a control module. The control module may be configured to define a region of interest corresponding to a user's eye; calibrate a background pixel range of the region of interest of the user's eye; emit a random pattern of light from the device; capture a reflection of the random pattern reflected from the region of interest of the user's eye; and verify a live user by comparing the captured reflected image to an expected pixel pattern.

Other embodiments may comprise a system for improving verification of passive recognition of a user's face by a device. The system may comprise a camera connected to a display device and a control module. The control module may be configured to define a region of interest corresponding to a user's eye; calibrate a background pixel range of the region of interest of the user's eye; display a verification pattern on a display of the device; capture a reflected image of the verification pattern from the region of interest of a user's eye; and verify a live user by comparing the captured reflected image to an expected pixel pattern.

Another innovative aspect disclosed is an apparatus for improving verification of passive recognition of a user's face by a device. The apparatus may include a processor; a memory, operably coupled to the processor; a display, operably coupled to the processor; and an imaging sensor operably coupled to the processor. The apparatus may further include a calibration module configured to define a region of interest corresponding to a user's eye and calibrate a background pixel range of the region of interest of the user's eye; a pattern generating module configured to generate and emit a verification pattern from a display of the device; an image capture module configured to capture a reflected image of the verification pattern from the region of interest of the user's eye; and a verification module configured to compare the captured reflected image to an expected pixel pattern.

Other embodiments may include a device for improving verification of passive recognition of a user's face by a device. The device may comprise an imaging sensor configured to capture an image of a user's eye; means for defining a region of interest of the user's eye; means for calibrating a background pixel region of interest of the user's eye with the device light off; means for displaying a random verification pattern on the display; means for capturing a reflection of the verification pattern reflected from the region of interest of a user's eye; and means for verifying a live user by comparing a captured pixel value with a background pixel value for each pixel in the region of interest.

Other embodiments may include a non-transitory computer readable medium, storing instructions that when executed by a processor, cause the processor to perform the method of defining a region of interest corresponding to a user's eye; calibrating a background pixel range of the region of interest of the user's eye with a device light off; emitting a random verification pattern from the device; capturing a reflection of the verification pattern reflected from the region of interest of a user's eye; and verifying a live user by comparing a captured pixel value with a background pixel value for each pixel in the region of interest.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION OF THE PREFERRED EMBODIMENT

System Overview

Figure 1:
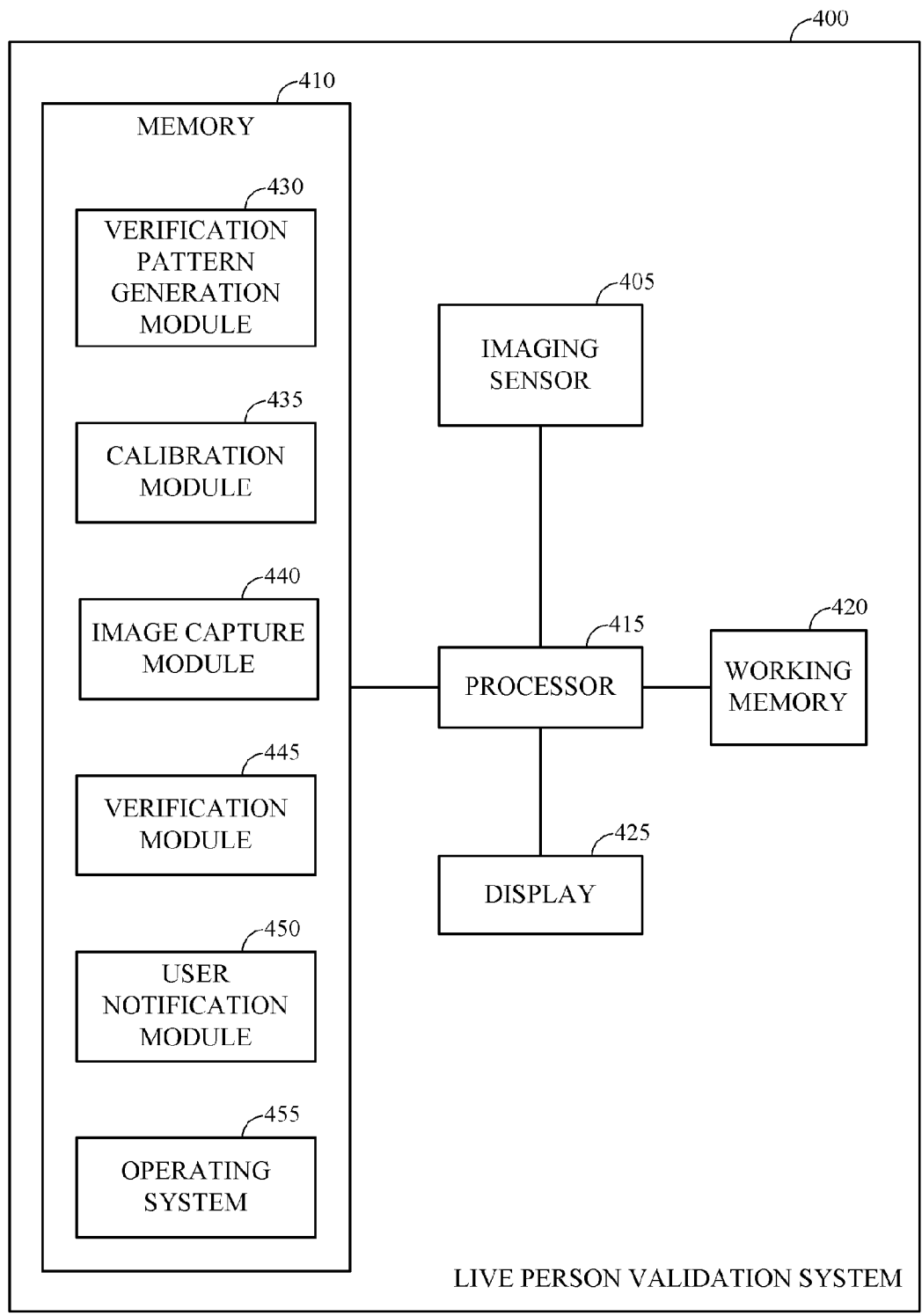
FIG. 1 is a schematic block diagram of a live person verification system, according to one implementation.

Implementations disclosed herein provide systems, methods, and apparatus for verifying a live human face with an electronic device. For example, in one embodiment, the system may define a region of interest within a user's eye to measure reflection from the device. Using facial recognition software that is configured to determine the position of the user's eyes, and also features such as the position of the iris and pupil within a user's eye, the system can use those measurements to define a region of the pupil to measure screen reflection from the display device. For example, the system may define a region of the eye that includes a central portion of the pupil as a region of interest. The system can then illuminate the screen of a display device with a predetermined color or pattern of light and measure the reflection of that light from the region of interest of the user's eye. Because of the curvature of the user's eyeball, the area of light reflected by a live person will be wholly within the region of interest, but any flat surface such as a photo or digital display will reflect light from an area outside of the region of interest. Thus, any reflection from outside the defined region of interest indicates reflection off of a flat surface and thus a fail condition for verifying a live person. Similarly, any reflection within the region of interest that is too small will also be a fail condition.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination may correspond to a return of the function to the calling function or the main function, or a similar completion of a subroutine or like functionality.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

FIG. 1 illustrates one implementation of a live user verification system 400 for verifying that an imaged human face is a live human face. The live user verification system 400 includes an imaging sensor 405. The imaging sensor 405 can be configured to sense a broad band of wavelengths, including at least visible light wavelengths. In some implementations, a charge-coupled device (CCD) can be used as the imaging sensor 405. In other implementations, a CMOS imaging sensor can be used as the imaging sensor 405.

The live user verification system 400 can further include a processor 415 linked to the imaging sensor 405. A working memory 420, electronic display 425, and memory 410 are also in communication with processor 415. Live user verification system 400 may be a stationary device such as a desktop personal computer or it may be a mobile device, such as a tablet, laptop computer, or cellular telephone.

Processor 415 may be a general purpose processing unit or a processor specially designed for imaging applications. As shown, the processor 415 is connected to a memory 410 and a working memory 420. In the illustrated embodiment, the memory 410 stores a verification pattern generation module 430, a calibration module 435, an image capture module 440, a verification module 445, a user notification module 450, and operating system 455. These modules may include instructions that configure the processor 415 to perform various image processing and device management tasks. The memory 410 can be any suitable computer-readable storage medium, such as a non-transitory storage medium. Working memory 420 may be used by processor 415 to store a working set of processor instructions contained in the modules of memory 410. Alternatively, working memory 420 may also be used by processor 415 to store dynamic data created during the operation of live user verification system 400.

As mentioned above, the processor 415 is configured by several modules stored in the memory 410. The verification pattern generation module 430 can comprise computer-implemented instructions that configure the processor 415 to generate and emit a verification pattern from the display 425 of the device. Therefore, processor 415, along with verification pattern generation module 430 and display 425, represent one means for displaying a verification pattern on a display. The calibration module 435 includes instructions that configure the processor 415 to determine and calibrate a region of interest of a user's eye, as will be discussed in more detail below with reference to FIG. 3. Therefore, processor 415, along with calibration module 435, represents one means for defining a region of interest of the user's eye.

Memory 410 further includes an image capture module 440. The image capture module 440 includes instructions that configure the processor 415 to instruct the imaging sensor 405 to capture images of the region of interest of the user's eye, including the reflection in the region of interest of the user's eyes of the verification pattern generated by the verification pattern generation module 430. Therefore, processor 415, along with calibration module 435, image capture module 440, and imaging sensor 405, represents one means for calibrating a background pixel region of interest of the user's eye. Additionally, processor 415, along with image capture module 440 and imaging sensor 405, represent one means for capturing a reflection of the verification pattern reflected from the region of interest of the user's eye.

A verification module 445 can also be stored in memory 410. The verification module 445 includes instructions that configure the processor 415 to compare the reflected image captured by the imaging sensor 405 to the emitted pattern to verify a live user of the device, as will be discussed in more detail below with reference to FIG. 4. Memory 410 also contains user notification module 450. The user notification module 450 includes instructions that configure the processor 415 to notify a user of a verification failure or verification pass event. Therefore, processor 415, along with verification module 445, represent one means for verifying a live user by comparing a captured pixel value with a background pixel value for each pixel in the region of interest.

Operating system 455 configures the processor 415 to manage the memory and processing resources of system 400.

For example, operating system 455 may include device drivers to manage hardware resources such as the electronic display 425 or imaging sensor 405. Therefore, in some embodiments, instructions contained in the live user verification system modules discussed above may not interact with these hardware resources directly, but instead interact through standard subroutines or APIs located in operating system 455. Instructions within operating system 455 may then interact directly with these hardware components.

The live user verification system 400 can be implemented on a mobile device, including a mobile phone or smartphone, a tablet computer, a laptop computer, a digital camera, or the like. By integrating the processor 415, memory 410, imaging sensor 405, and electronic display 425 on a mobile device, the live user verification system 400 can be advantageously used without requiring the system to remain in a fixed location. In other implementations, however, the live user verification system 400 can comprise a desktop computer, server, computer workstation, or other type of computing device. The live user verification system 400 can be integrated with the computer hardware or the live user verification system can be separate from the computing device.

Although FIG. 1 depicts a system comprising separate components including a processor, an imaging sensor, an electronic display, and memory, one skilled in the art would recognize that these separate components may be combined a variety of ways to achieve particular design objectives. For example, in an alternative embodiment, the memory components may be combined with processor components to save cost and improve performance.

Additionally, although FIG. 1 illustrates two memory components, including memory component 410 comprising several modules and a separate memory 420 comprising a working memory, one with skill in the art would recognize several embodiments utilizing different memory architectures. For example, a design may utilize ROM or static RAM memory for the storage of processor instructions implementing the modules contained in memory 410. Alternatively, processor instructions may be read at system startup from a disk storage device that is integrated into live person verification system 400 or connected via an external device port. The processor instructions may then be loaded into RAM to facilitate execution by the processor. For example, working memory 420 may be a RAM memory, with instructions loaded into working memory 420 before execution by the processor 415.

Live Person Verification Overview

Figure 2:
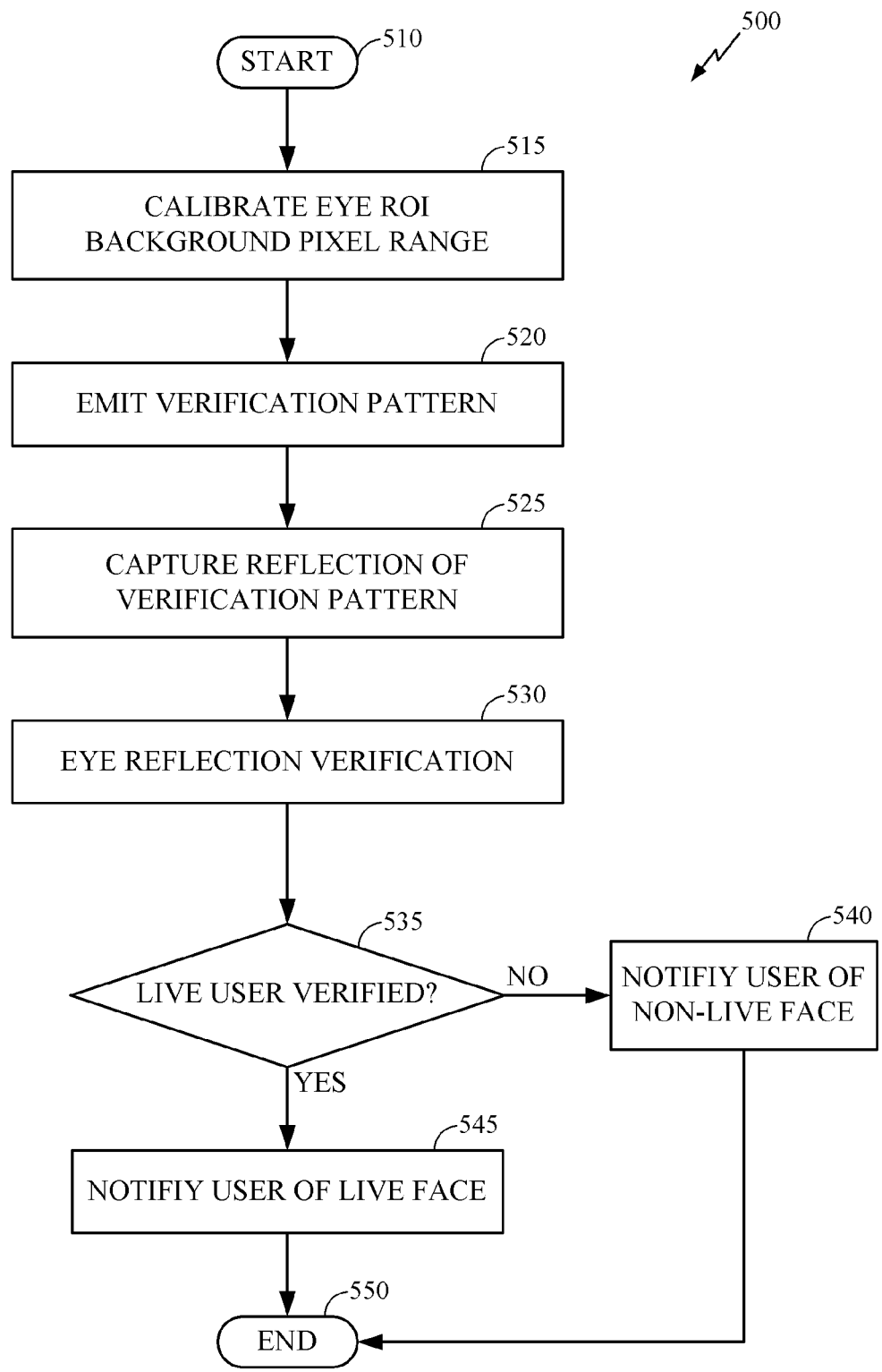
FIG. 2 is a flow chart illustrating a live person verification process according to one implementation.

FIG. 2 is a flowchart illustrating a high-level overview of one implementation of a method 500 for verifying a live user of an electronic device that may be implemented by several modules depicted in FIG. 1. The method 500 starts with a start block 510 and then moves to a block 515, wherein a background pixel range of a region of interest of a user's eye is calibrated.

The region of interest may be defined as a rectangular area of a user's eye that includes the user's pupil. Due to the curvature of the eye surface, a reflection of the environment can be seen as a reduced mirror image in the region of interest. As will be discussed later, this reduced mirror image may be compared to a generated pattern to verify a live user.

The acquisition of the background range of each pixel in the region of interest establishes an initial range of values for each pixel in the region of interest to which the captured reflected image will be compared in the verification process which is discussed in greater detail below.

Figure 5:
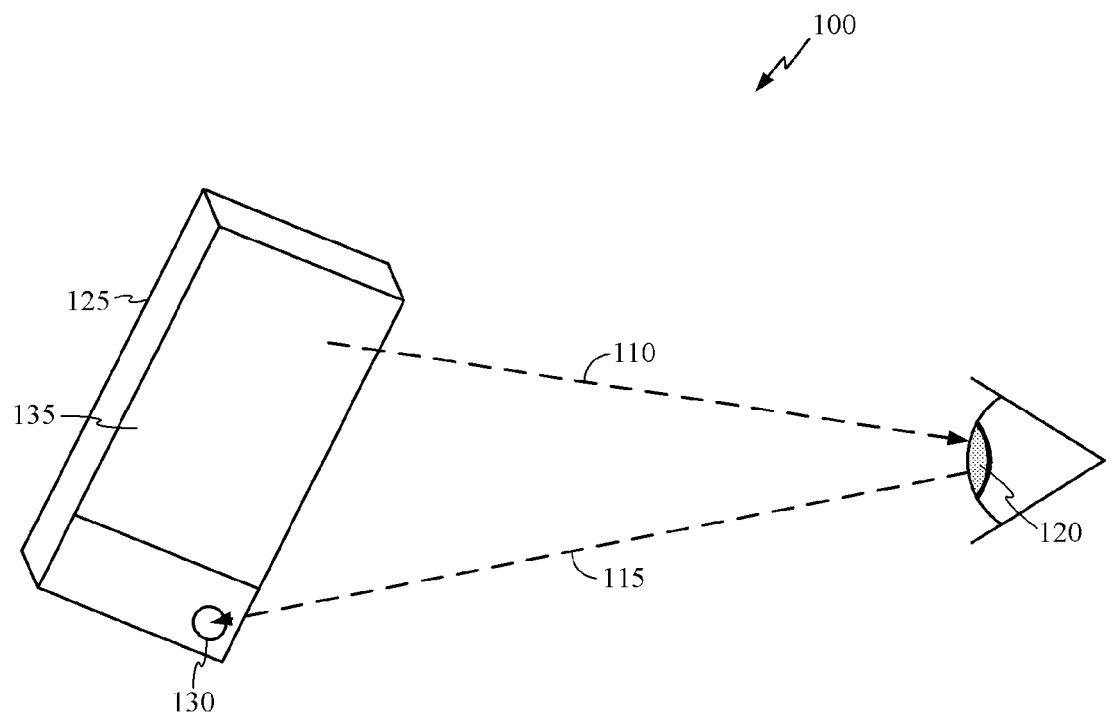
FIG. 5 illustrates live person verification according to one implementation of the present invention.
Figure 6A:
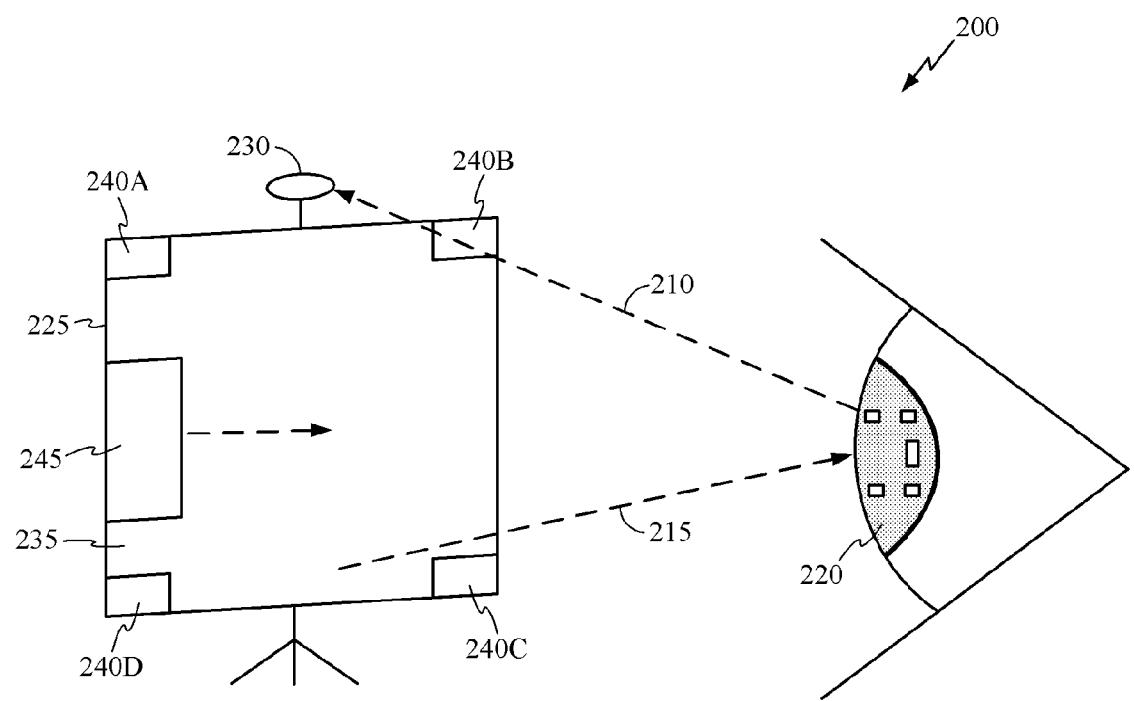
FIG. 6A illustrates live person verification, according to a second implementation.
Figure 7A:
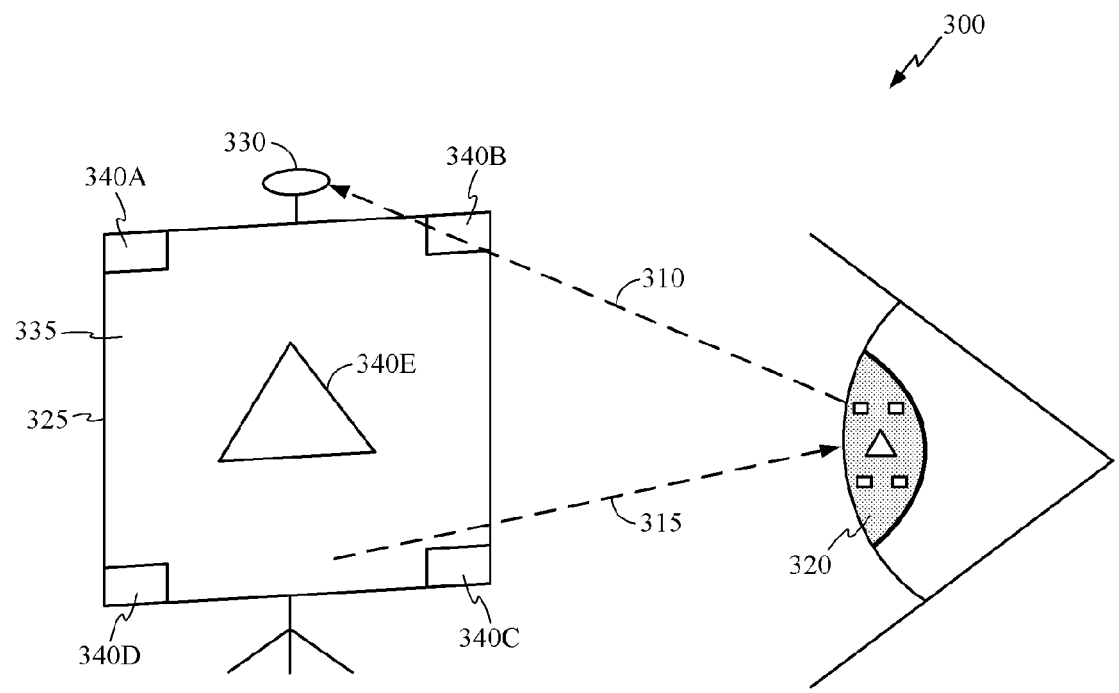
FIG. 7A illustrates live person verification, according to a third implementation.

Once the region of interest of a user's eye has been determined and calibrated, process 500 transitions to block 520 where instructions direct the electronic device to emit a verification pattern. In one embodiment, the verification pattern may be a random sequence of turning a display light on and off, as shown in FIG. 5. In other embodiments, the verification pattern may be a moving or fixed black and white patterned image, as shown in FIGS. 6A and 7A. The verification pattern is designed to be displayed so that its reflection can be measured in the user's eyes.

After the verification pattern is emitted, process 500 transitions to block 525 wherein the imaging sensor 405 captures at least one image of the reflection of the verification pattern from the region of interest of a user's eye. The process 500 then transitions to block 530 wherein verification of the reflected image from the user's eye with the emitted verification pattern is performed, as is discussed in greater detail with respect to FIG. 4.

After performing the verification process, the process 500 transitions to block 535 where a decision is made as to whether a live user of the electronic device is verified. If a live user is verified, process 500 transitions to block 545 wherein the system 400 notifies the user of successful live user verification. There are various ways to determine if the detected face is that of a live user. For example, as explained below with respect to FIG. 4, the number and location or cluster sizes of pixels reflecting light from the user's eye can be computed. If the location of the cluster sizes of light-reflecting pixels within the region of interest matches the emitted pattern, then it can be determined that the detected face is a live human face. In one embodiment, a percentage match of at least about 80% of the light-reflecting clusters of pixels compared with the emitted pattern from the display device will indicate successful live user verification. In other embodiments, a percentage match of at least about 70%, at least about 75%, or at least about 83% will indicate successful live user verification. Process 500 then transitions to block 550 and ends.

However, if a live user is not verified in decision block 535, process 500 transitions to block 540 wherein the system 400 notifies the user of a live face verification failure. Process 500 then transitions to block 550 and ends.

The live user verification system relates to detecting either particular light or an image pattern reflected from a region of interest of the user's eye, as shown in the examples discussed below with reference to FIGS. 5, 6A-B, and 7A-B. The brightness and color of the reflected image can be different depending on the user's eye color or shape.

The brightness and size of the reflected image is dependent on the size of the device's screen (if the light is emitted from the screen), the distance between the display screen and the user, and the capture resolution of the imaging sensor 405.

The reflection from eyes of different color may change the reflected color. However, algorithms used in one embodiment of the invention use the grey-level plane (Y-plane) for the captured details in the colored portion or iris of the eye. Black and white colors are preferably used for the display object to create a greater reflection brightness contrast and so that the motion of the foreground object is observed in all grey levels. Other embodiments may display the object in different colors and measure the color reflection.

Calibration Process

Figure 3:
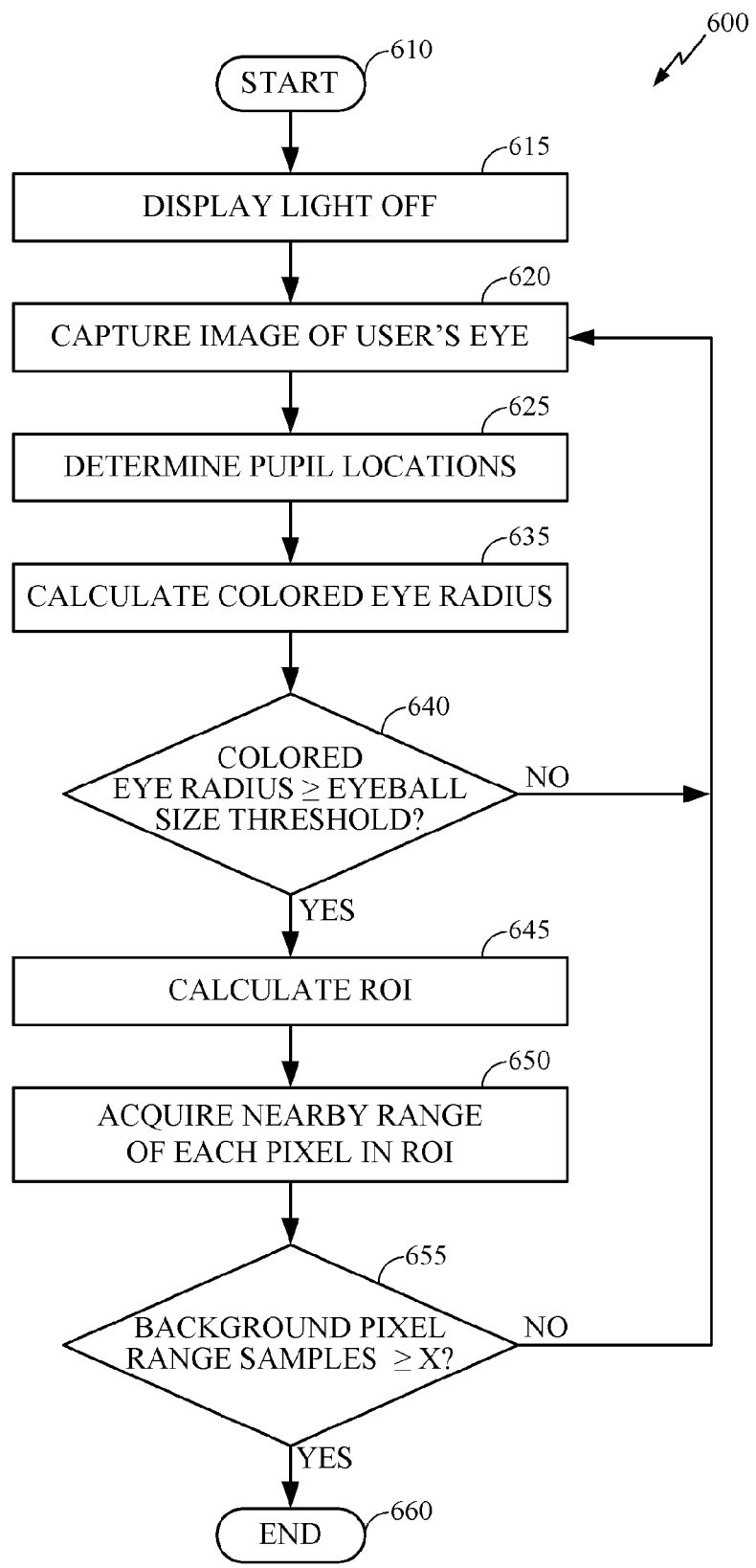
FIG. 3 is a flow chart illustrating a calibration process, according to one implementation.

FIG. 3 is a flowchart illustrating one method 600 for determining a region of interest of a user's eye and calibrating a background range of pixels of the region of interest. The method 600 begins at a start block 610 and transitions to a block 615 where a display light is turned off such that the display device is not emitting any light or pattern. Process 600 then transitions to block 620 wherein the imaging sensor 405 captures an image of the user's eye.

Process 600 then transitions to block 625 wherein pupil locations of the user's eye are determined. The pupil locations may be acquired using facial recognition software. In addition to the location of the pupil, the facial recognition software also provides the four locations which determine a rectangular region of interest of a user's eye. This region of interest includes the user's pupil. Specifically, facial recognition software provides four locations of the eye when the eye is in an up, down, left or right position. These locations may be defined as the up location of the eye, the down location of the eye, the left location of the eye, and the right location of the eye. These eye locations may be given in the form of coordinate locations.

Once the pupil and eye locations have been determined, process 600 transitions to block 635 wherein calculation of the colored eye radius or the radius of the iris of the user's eye is performed. The colored eye radius may be defined as one-half of the distance between the up location of the eye and the down location of the eye. After determining the colored eye radius, process 600 transitions to decision block 640 wherein the colored eye radius is compared to an eyeball-sized threshold. If the colored eye radius is greater than or equal to the eyeball-size threshold, then process 600 transitions to block 645 where the region of interest is calculated. However, if the colored eye radius is less than the eyeball size threshold, process 600 returns to block 620 and repeats the sequence of capturing an image of the user's eye and determining the pupil and eye locations.

In block 645, the size of the region of interest (ROI) is determined from the colored eye radius according to the following equation:

$$\text{ROI\_size} = 2 * \text{Colored Eye Radius} * \text{Ratio} \quad (1)$$

Where Ratio is an experimentally-derived percentage chosen to ensure the ROI is located within the colored portion (iris) of the user's eye. In one embodiment, the region of interest is centered with the user's pupil.

After the size of the region of interest has been calculated, the location of the region of interest may be determined by defining the top left and bottom right coordinates of the region of interest. These coordinates may be found by using the x and y coordinates of the location of the user's pupil, as determined from facial recognition software. The coordinates defining the region of interest may be determined by the following equations:

$$\text{ROI\_top\_left\_}x = \text{pupil\_}x - (\text{ROI\_size}/2) \quad (2)$$

$$\text{ROI\_top\_left\_}y = \text{pupil\_}y - (\text{ROI\_size}/2) \quad (3)$$

$$\text{ROI\_bottom\_right\_}x = \text{pupil\_}x + (\text{ROI\_size}/2) \quad (4)$$

$$\text{ROI\_bottom\_right\_}y = \text{pupil\_}y + (\text{ROI\_size}/2) \quad (5)$$

In equations (2)-(5), pupil_x denotes the x-coordinate of the user's pupil location and pupil_y denotes the y-coordinate of the user's pupil location.

Once the region of interest's size and location and have been calculated, process 600 transitions to block 650 wherein the nearby background range of each pixel in the region of interest is acquired. The acquisition of the background range of each pixel in the region of interest establishes an initial range of values for each pixel in the region of interest to which the captured reflected image will be compared in the verification process which is discussed in greater detail below.

After acquiring the background range of each pixel in the region of interest, process 600 transitions to block 655 where the number of background pixel range samples are compared to a threshold value x. If the number of background pixel range samples is greater than or equal to this threshold value, process 600 transitions to block 660 and ends with a successful calibration. However, if the number of background pixel range samples is less than the threshold value, process 600 returns to block 620 and the calibration process 600 is repeated beginning with the image capture of the user's eye. The calibration process 600 proceeds as discussed above until a successful calibration is achieved.

Verification Process

Figure 4:
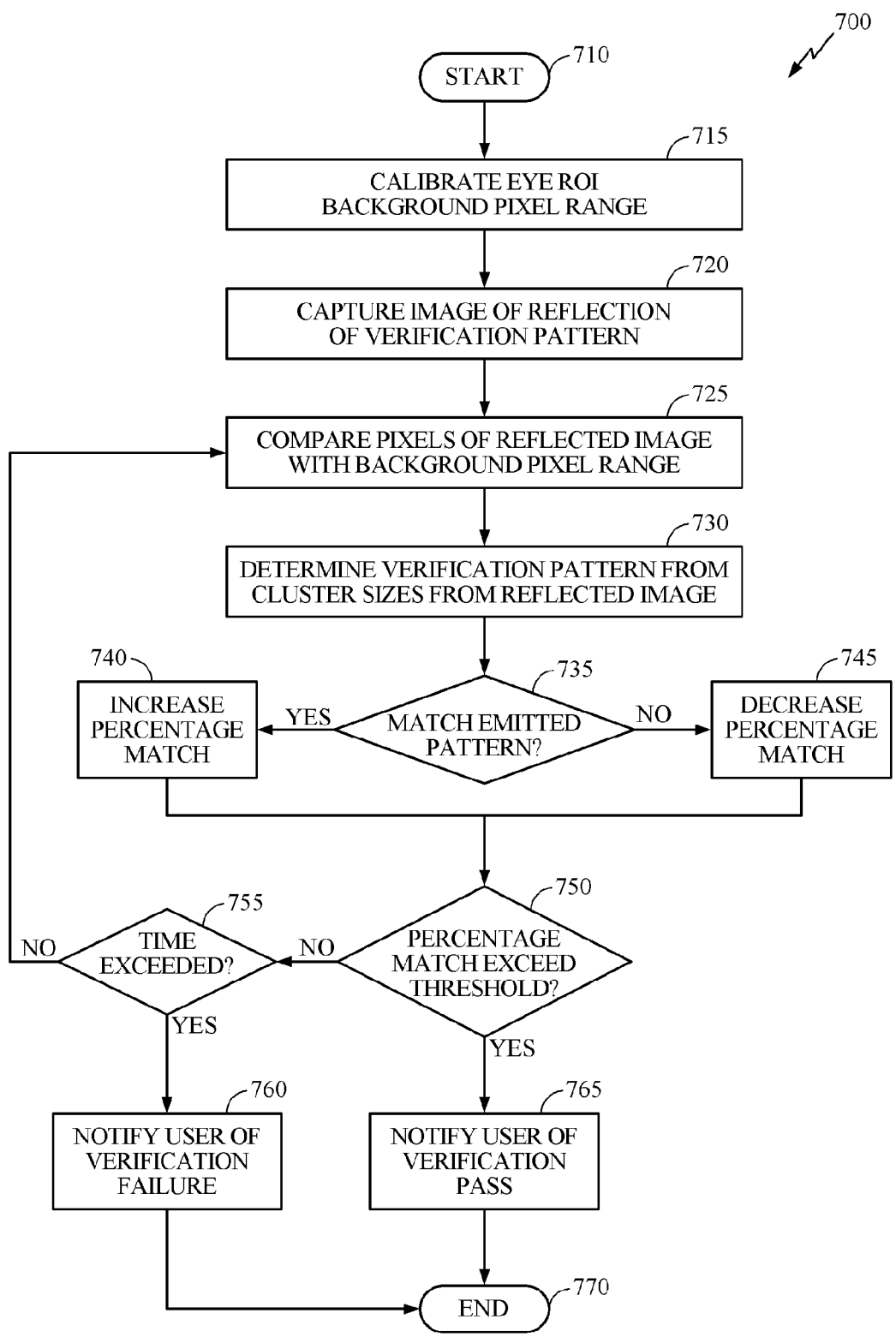
FIG. 4 is a flow chart illustrating a verification process, according to one implementation.

FIG. 4 is a flowchart illustrating one method 700 for performing a verification process to determine a live user by comparing a captured reflected image from a user's eye to an emitted verification pattern. The method 700 begins at a start block 710 and transitions to a block 715 wherein calibration of the background pixel range of the region of interest of the user's eye is performed. This calibration step is similar to that discussed above with respect to process 600. Process 700 then transitions to block 720 wherein imaging sensor 405 captures at least one image of the verification pattern reflection in the region of interest of the user's eye.

Once the image of the verification pattern reflection has been captured by the imaging sensor 405, process 700 transitions to block 725 where the pixels of the reflected image are compared with the background pixel range of the region of interest. Process 700 continues with block 730 wherein the reflected pattern is determined from the size of clusters of "lighted" pixels of the reflected image. Clusters may be determined by searching for "lighted" pixels in touch with one another and which have pixel values well above the background pixel range in the region of interest of the user's eye. The choice of the cluster size range is dependent on the typical curvature of the eye such that the entire pattern image is well within the eye region of interest. The choice of the cluster size range may also be dependent on the fixed display pattern size such that a larger display pattern implies a larger size. The distance of the device from the user also affects the choice of the cluster size range as the closer the device is to the user, the larger the reflected image to be captured in the region of interest. Additionally, the capture resolution of the camera also influences the choice of the cluster size range as higher capture resolution will enable greater pixel capture. Therefore, the size of the cluster within the region of interest inside the eye conveys important information necessary to verify the reflected image.

In one example, a "lighted" pixel value may be greater than the background pixel range +10. Additionally, the size of the "lighted" cluster of pixels is preferably within the region of interest in order to satisfy the converged reflection property of the eye. In one example, using 720p capture for a smartphone image, a valid "lighted" cluster size may be defined as between 3 and 20 pixels.

Process 700 then transitions to block 735 where a decision is made regarding the comparison between the reflected image captured from the region of interest and the emitted verification pattern. If the "lighted" cluster sizes and locations match the emitted verification pattern, process 700 transitions to block 740 wherein the percentage match between the reflected image and the emitted verification pattern is increased. However, if the "lighted" cluster sizes and locations do not match the emitted verification pattern, process 700 transitions to block 745 wherein the percentage match is decreased.

In either case, process 700 then transitions to block 750 where a decision is made as to whether the percentage match between the reflected image and the emitted verification pattern exceeds a threshold match percentage. If the percentage match exceeds the threshold match percentage, process 700 transitions to block 765 wherein the user is notified of successful live user verification. However, if the percentage match does not exceed the threshold match percentage, process 700 transitions to block 755 where a decision is made regarding the time elapsed for the verification process. If the time elapsed has exceed a set total time to complete the live user verification, process 700 transitions to block 760 wherein the user is notified of a failure to verify a live user. However, if the time elapsed has not exceed the allowed time to complete the verification, process 700 transitions to block 725 and repeats the comparison of the pixels of the reflected image with the background pixel range of the region of interest. Process 700 then continues as outlined above until successful live user verification occurs or the time to complete the live user verification is exceeded.

Preferably, the verification of a live user is performed within one second to avoid the affect of lighting changes or the user blinking or moving his or her head during the verification process. In some embodiments, the system can use a moving sample to account for an invalid eye condition or verification failure or to allow a certain error percentage within a certain time frame. For example, the system may require an approximate 80% match in 16 running samples or images taken within a one second time frame to define a verification pass.

Experiments have determined that a user wearing glasses or contact lenses may still be verified. Preferably, clear or transparent glasses or contacts will have less impact on the reflected image and the verification process.

Examples

FIG. 5 illustrates one example 100 of a live user verification system for verifying that an imaged human face is a live human face. In this example, a display device 125 has an imaging sensor 130 and a display screen 135. The display screen 135 may show a predetermined color, such as a fully white screen, alternating with a black screen in a random pattern. In other embodiments, alternating light and dark colors, for example yellow and dark blue, or other colors that are not fully white or black may be displayed. This random pattern 110 is transmitted to the user's eye 120. The imaging sensor 130 captures an image or series of images of the reflection of the random pattern 115 from the user's eye 120. The system can analyze the image of the reflected pattern to determine if the reflection originated from the predetermined region of interest of the user's eye and if the reflected pattern matches the predetermined emitted pattern and thus verify a live user. In one example, with a high frame rate of the display (60 frames per second or fps) and capture (120 fps), a 60-bit random pattern can be emitted from the device and tested within one second to quickly verify a live user's face.

Figure 6B:
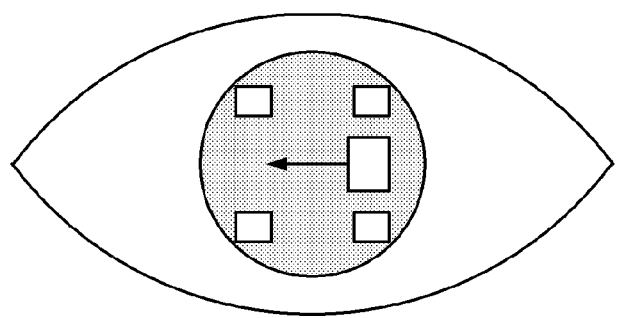
FIG. 6B illustrates the reflection of the pattern movement in a user's eye according to the implementation illustrated in FIG. 6A.

FIG. 6A illustrates a second example 200 of a live user verification system for verifying that an imaged human face is a live human face. In this example, a display device 225 has an imaging sensor 230 and a screen 235. The display screen 235 may show a predetermined pattern consisting of light-colored regions 240A-D on a dark background as shown, or, alternatively, dark-colored regions on a light background. In other embodiments, there may be one, two, or three or more than four light-colored regions on a dark background. A portion of the image 245 may move from left to right across the screen 235, as shown. In other embodiments, the image 245 may move from right to left, from top to bottom, from bottom to top, in a clockwise direction, or in an anticlockwise direction on the screen 235. The foreground image 245 may be a square, triangle, or other easily recognizable shape with defined boundaries and corners. As in the previous example shown in FIG. 5, the pattern 215 shown on the display screen 235, including the moving foreground object 245, is transmitted to the user's eye 220. The imaging sensor 230 captures an image or series of images of the reflection of the pattern 210 from a user's eye 220. As the display shows the moving image 245, the imaging sensor 230 may track the mirror reflection of the corresponding object's movement in the user's eye 220. FIG. 6B illustrates the reflection of the pattern 215 and object's movement in the user's eye 220. As shown in FIG. 6B, the reflection is a mirror reflection of the pattern 215 shown on the display device 225. The movement of the object 245, which is shown in FIG. 6A as moving from left to right, is shown in the reflected image from the user's eye 220, as in FIG. 6B, as moving from right to left. The system can analyze and compare the reflected image's object motion direction against the object motion direction as shown on the display device 225. If the motion directions match, the system verifies a live user of the display device.

Figure 7B:
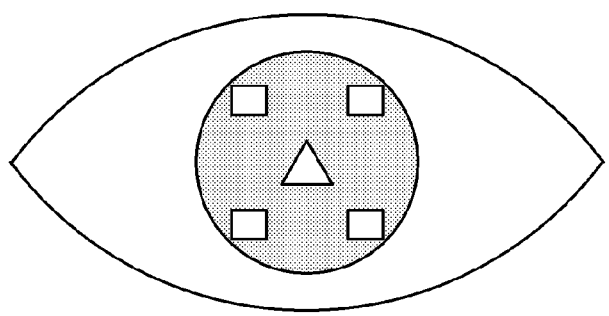
FIG. 7B illustrates the reflection of the shape or pattern in a user's eye according to the implementation illustrated in FIG. 7A.

A third example 300 of a passive live user verification system is illustrated in FIG. 7A. In this example, a display device 325, as in FIG. 6A, has an imaging sensor 330 and a display screen 335. The display screen 335 may show a predetermined shape or pattern consisting of light-colored regions 340A-E on a dark background as shown, or, alternatively, dark-colored regions on a light background. In the example shown in FIG. 7A, the pattern may consist of four square shapes and one triangular shape. In other embodiments, there may be one, two, three, four, five, or more shapes of various sizes, including but not limited to triangles, squares, circles, rectangles, etc. or other easily recognizable shape with known corners and edges. As in the previous examples shown in FIGS. 5 and 6A, the pattern 315 shown on the display screen 335 is transmitted to the user's eye 320. The imaging sensor 330 captures an image or series of images of the reflection of the pattern 310 from a user's eye 320. FIG. 7B illustrates the reflection of the pattern 315 in the user's eye 320. As shown in FIG. 7B, the reflection is a mirror reflection of the pattern 315 shown on the display device 325. The system can analyze the image of the reflected pattern captured by the sensor 330 to determine if the reflection originated from the predetermined region of interest of the user's eye and if the reflected pattern matches the predetermined emitted pattern, and thus verify a live user.

Experiments have been conducted with a small 4 inch display smartphone device with 720p capture mode enabled. In one example, the reflected image off a user's eye of the white and black screen of the smartphone was found to be 12 pixels when the distance between the eye and the device was approximately one foot. A higher resolution imaging sensor, such as 1920×1080 and above may provide a more detailed capture of the reflection from a user's eye.

Clarifications Regarding Terminology

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method for authenticating a user of a device, comprising:
    defining a region of interest corresponding to a user's eye;
    acquiring a background pixel value of each pixel in the region of interest of the user's eye;
    emitting a random verification pattern from a display of the device;
    capturing a reflected image of the verification pattern from the region of interest of the user's eye; and
    verifying a live user by comparing the captured pixel values of the reflected image to the background pixel value for each pixel in the region of interest and to an expected pixel pattern by determining a reflected pattern from cluster sizes of pixels of the reflected image and determining whether the reflected pattern matches the emitted random verification pattern.

2. The method of claim 1, wherein calibrating a background pixel value of each pixel in the region of interest of the user's eye is conducted with a display light turned off.

3. The method of claim 1, wherein defining a region of interest corresponding to a user's eye comprises determining the location of a user's eye on the user's face.

4. The method of claim 3, wherein defining a region of interest corresponding to a user's eye comprises locating a region encompassing a user's pupil, the region defined by an upper boundary, a lower boundary, a left boundary, and a right boundary.

5. The method of claim 1, wherein the verification pattern comprises a display light turned on and off in a random pattern.

6. The method of claim 1, wherein the verification pattern is a static black and white image displayed on the display.

7. The method of claim 6, wherein verifying a live user comprises determining a reflected pattern from cluster sizes of pixels of the reflected image and determining whether the reflected pattern matches the static black and white image displayed on the display.

8. The method of claim 1, wherein the verification pattern is a static color image displayed on the display.

9. The method of claim 8, wherein verifying a live user comprises determining a reflected pattern from cluster sizes of pixels of the reflected image and determining whether the reflected pattern matches the static color image displayed on the display.

10. The method of claim 1, wherein the verification pattern is a moving image displayed on the display.

11. The method of claim 10, wherein the moving image is a black and white image.

12. The method of claim 11, where verifying a live user comprises determining a reflected pattern from cluster sizes of pixels of the reflected image and determining whether the reflected pattern matches the moving black and white image.

13. The method of claim 10, wherein the moving image is a color image.

14. The method of claim 13, where verifying a live user comprises determining a reflected pattern from cluster sizes of pixels of the reflected image and determining whether the reflected pattern matches the moving color image.

15. A system for improving verification of passive recognition of a user's face by a device, comprising:
    an image sensor connected to a display device; and
    a processor configured to execute instructions to perform a method of:
        defining a region of interest corresponding to a user's eye;
        acquiring a background pixel value of each pixel in the region of interest of the user's eye;
        emitting a random pattern of light from the device;
        capturing a reflection of the random pattern reflected from the region of interest of the user's eye; and
        verifying a live user by comparing the captured pixel values of the reflected image to the background pixel value for each pixel in the region of interest and to an expected pixel pattern by determining a reflected pattern from cluster sizes of pixels of the reflected image and determining whether the reflected pattern matches the emitted random pattern.

16. The system of claim 15, wherein defining a region of interest corresponding to a user's eye comprises determining the location of a user's eye on the user's face.

17. The system of claim 16, wherein defining a region of interest corresponding to a user's eye comprises locating a region encompassing a user's pupil, the region defined by an upper boundary, a lower boundary, a left boundary, and a right boundary.

18. A system for improving verification of passive recognition of a user's face by a device, comprising:
a camera connected to a display device; and
a processor configured to execute instructions to perform a method of:
defining a region of interest corresponding to a user's eye;
acquiring a background pixel value of each pixel in the region of interest of the user's eye;
displaying a random verification pattern on a display of the device;
capturing a reflected image of the verification pattern from the region of interest of a user's eye; and
verifying a live user by comparing the captured pixel values of the reflected image to the background pixel value for each pixel in the region of interest and to an expected pixel pattern by determining a reflected pattern from clusters sizes of pixels of the reflected image and determining whether the reflected pattern matches the displayed random pattern.

19. The system of claim 18, wherein defining a region of interest corresponding to a user's eye comprises determining the location of a user's eye on the user's face.

20. The system of claim 19, wherein defining a region of interest corresponding to a user's eye comprises locating a region encompassing a user's pupil, the region defined by an upper boundary, a lower boundary, a left boundary, and a right boundary.

21. The system of claim 18, wherein the verification pattern is a static black and white image displayed on the display.

22. The system of claim 18, wherein the verification pattern is a static color image displayed on the display.

23. The system of claim 22, wherein verifying a live user comprises determining a reflected pattern from cluster sizes of pixels of the reflected image and determining whether the reflected pattern matches the static color image displayed on the display.

24. The system of claim 18, wherein the verification pattern is a moving image displayed on the display.

25. The system of claim 24, wherein the moving image is a black and white image.

26. The system of claim 25, wherein verifying a live user comprises determining a reflected pattern from cluster sizes of pixels of the reflected image and determining whether the reflected pattern matches the moving black and white image displayed on the display.

27. The system of claim 24, wherein the moving image is a color image.

28. The system of claim 27, wherein verifying a live user comprises determining a reflected pattern from cluster sizes of pixels of the reflected image and determining whether the reflected pattern matches the moving color image displayed on the display.

29. An apparatus for improving verification of passive recognition of a user's face by a device, comprising:
a processor;
a memory, operably coupled to the processor;
a display, operably coupled to the processor;
an imaging sensor operably coupled to the processor;
a calibration module configured to define a region of interest corresponding to a user's eye and acquire a background pixel value of each pixel in the region of interest of the user's eye;
a pattern generating module configured to generate and emit a random verification pattern from a display of the device;
an image capture module configured to capture a reflected image of the verification pattern from the region of interest of the user's eye; and
a verification module configured to compare the captured pixel values of the reflected image to the background pixel value for each pixel in the region of interest and to an expected pixel pattern by determining a reflected pattern from cluster sizes of pixels of the reflected image and determining whether the reflected pattern matches the emitted random pattern.

30. The apparatus of claim 29, wherein the verification pattern comprises a display light turned on and off in a random pattern.

31. The apparatus of claim 30, wherein the verification module is configured to verify a live user by determining a reflected pattern from cluster sizes of pixels of the reflected image and determining whether the reflected pattern matches the emitted random pattern.

32. The apparatus of claim 29 further comprising a user verification module configured to notify the user of a verification failure or verification pass event.

33. A device for improving verification of passive recognition of a user's face by a device, comprising:
an imaging sensor configured to capture an image of a user's eye;
means for defining a region of interest of the user's eye;
means for acquiring a background pixel value of each pixel in the region of interest of the user's eye with the device light off;
means for displaying a random verification pattern on the display;
means for capturing a reflection of the verification pattern reflected from the region of interest of a user's eye; and
means for verifying a live user by comparing a captured pixel value with the background pixel value for each pixel in the region of interest by determining a reflected pattern from cluster sizes of pixels of the reflected image and determining whether the reflected pattern matches the displayed random pattern.

34. A non-transitory computer readable medium, storing instructions that when executed by a processor, cause the processor to perform the method of:
defining a region of interest corresponding to a user's eye;
acquiring a background pixel value of each pixel in the region of interest of the user's eye with a device light off;
emitting a random verification pattern from the device;
capturing a reflection of the verification pattern reflected from the region of interest of a user's eye; and
verifying a live user by comparing a captured pixel value with the background pixel value for each pixel in the region of interest by determining a reflected pattern from cluster sizes of pixels of the reflected image and determining whether the reflected pattern matches the emitted random pattern.

* * * * *